United States Patent [19] [11] 3,937,454
Colwill [45] Feb. 10, 1976

[54] SHEET RECIRCULATOR

[76] Inventor: Richard H. Colwill, 2650 Turk Hill Road, Victor, N.Y. 14564

[22] Filed: May 16, 1975

[21] Appl. No.: 578,084

[52] U.S. Cl. ..................... 271/6; 271/3.1; 271/272
[51] Int. Cl.² ..................... B65H 3/06; B65H 29/12
[58] Field of Search ..................... 271/3, 3.1, 4–7, 271/10, 34, 35, 172, 272; 355/64–97, 102

[56] References Cited
UNITED STATES PATENTS

| | | | |
|---|---|---|---|
| 3,552,739 | 1/1971 | Roberts et al. | 271/4 |
| 3,698,602 | 10/1972 | Gnage | 271/3.1 |

FOREIGN PATENTS OR APPLICATIONS

| | | | |
|---|---|---|---|
| 1,141,116 | 12/1962 | Germany | 271/3.1 |

Primary Examiner—Evon C. Blunk
Assistant Examiner—Robert Saifer
Attorney, Agent, or Firm—Stonebraker, Shepard & Stephens

[57] ABSTRACT

A recirculator feeds document sheets in order from a supply stack to the viewing window of a copier and back to the supply stack for as many times as desired to make a number of collated copies of a multi-page document. The recirculator is arranged above the copier window and has a sheet circulation path that is generally triangular. The supply stack is inclined along one side of the triangle, a second side of the triangle extends from the bottom of the supply stack across the copier window, and the third side extends from the copier window back up to the top of the supply stack. The device removes sheets successively from the bottom of the supply stack and advances them forward in order across the copier window and back up to the top of the supply stack.

11 Claims, 8 Drawing Figures

U.S. Patent Feb. 10, 1976 3,937,454
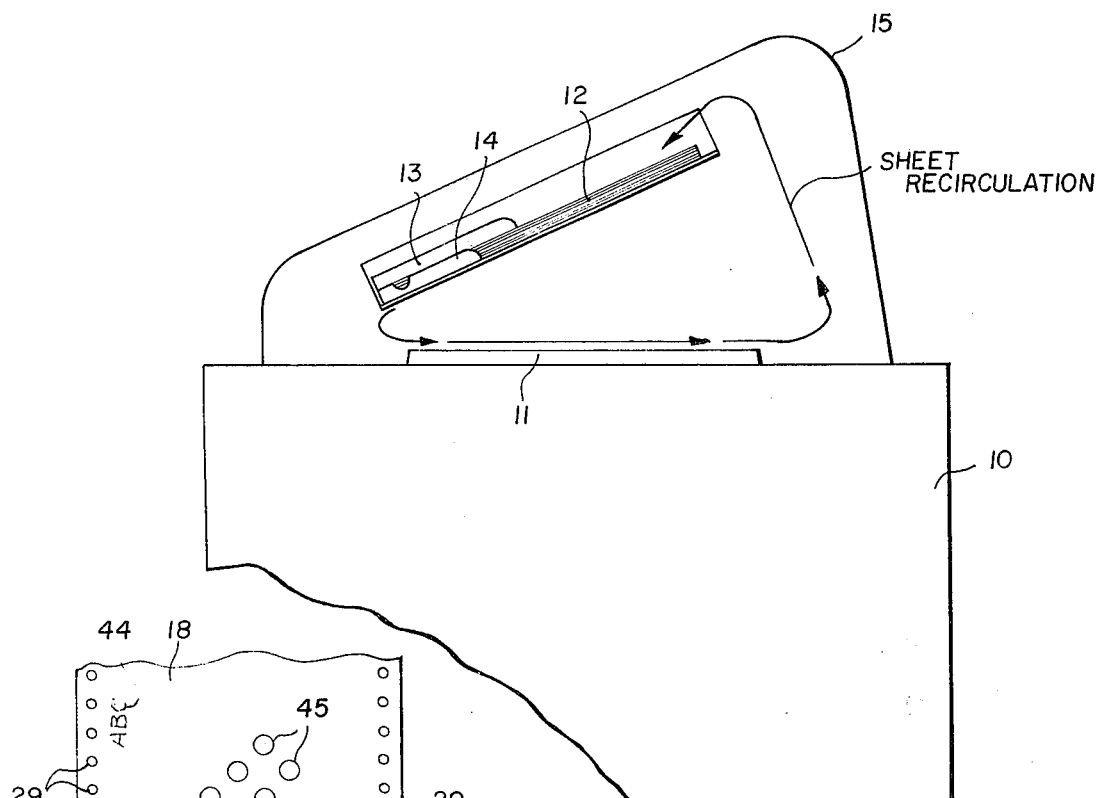
FIG. 1
FIG. 4
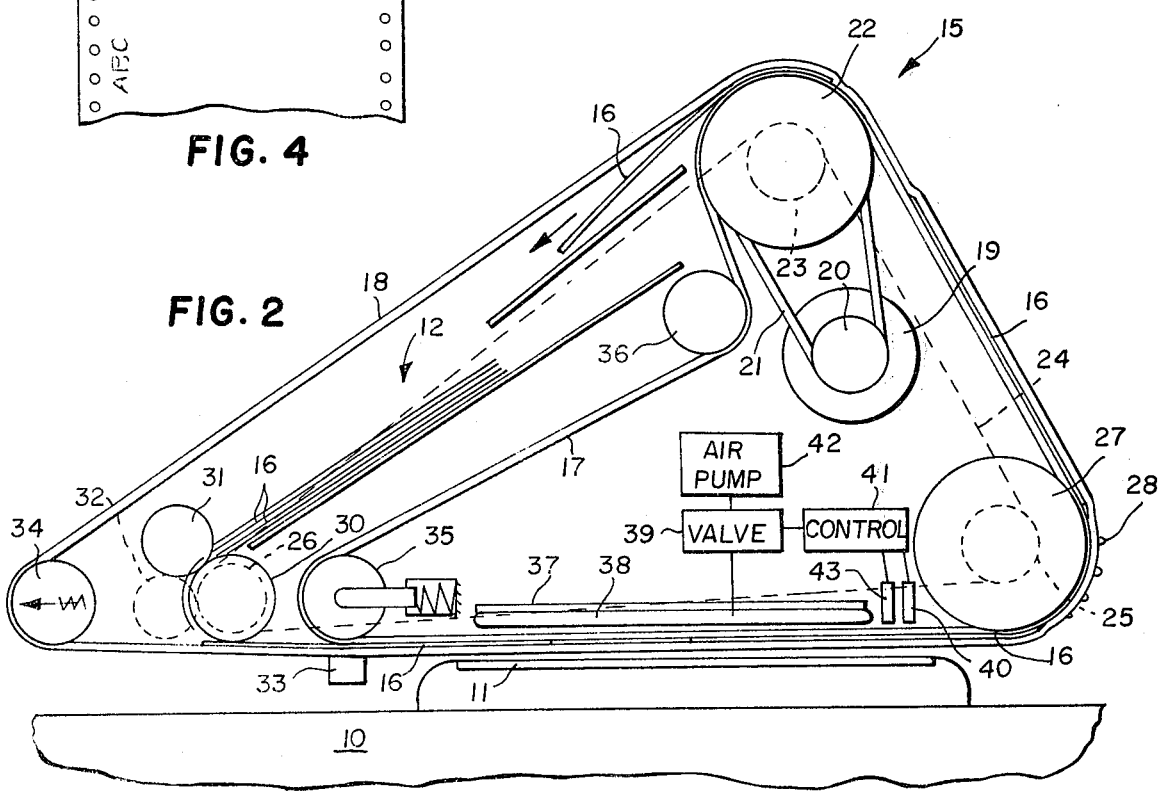
FIG. 2

SHEET RECIRCULATOR

THE INVENTIVE IMPROVEMENT

There are two basic ways of making multiple copies of a multi-page document. One way is to make the desired number of copies of each page of the document in succession, and then collate the copies, and the other is to make one copy of each sheet of the document in successive order for as many times as required to make the desired number of copies which are automatically collated, because the copies are made in the same order as the document sheets. For the latter method, there have been several suggestions for feeding sheets successively from a supply stack to a copier window and back to the supply stack, and the invention involves recognition of some of the problems and complexities of such devices. For example, most suggestions for recirculating the sheets of a document involve reversing the sheets or switching them between alternative paths, and reliable mechanisms for this become very complex.

The invention involves realization of a simpler and more expedient way of structuring a sheet recirculator for reliably feeding sheet around a recirculation path that crosses the copier window of a copying machine. The invention aims at simplicity, economy, versatility, and reliability in recirculating the sheets of a document for copying purposes.

SUMMARY OF THE INVENTION

The inventive device is for feeding document sheets in order from a supply stack to the viewing region of a copier and back to the supply stack. It includes apparatus arranged above the viewing region of the copier for forming a sheet circulation path that is generally triangular in vertical cross section. The supply stack is supported at an incline along a first side of the path, and a second side of the path extends from the lower region of the first side across the viewing region of the copier. A third side of the path extends from the viewing region upward to the upper region of the supply stack. Feeding means successively remove the bottom sheet of the supply stack from the lower region of the supply stack and advance the removed sheets successively in order into the second side of the path, and this is synchronized with the operations of the copier for copying the sheets in the viewing region. The copied sheets are then advanced successively in order from the second side of the path to the third side of the path and are then placed successively in order over the top sheet of the supply stack. One preferred arrangement for advancing the sheets is a pair of belts on opposite sides of the sheets and means for starting and stopping the belts, and another preferred arrangement is continuously driven rollers with a sheet-stopping and starting mechanism between the rollers for arresting the sheet at the copier window.

DRAWINGS

FIG. 1 is a partially schematic, front elevational view of a preferred embodiment of the inventive recirculator arranged over a copier;

FIG. 2 is a partially schematic, elevational view of the recirculator of FIG. 1 with the housing removed;

FIG. 4 is a fragmentary plan view of a preferred embodiment of a belt for the recirculator of FIG. 2;

DETAILED DESCRIPTION

Figure 3:
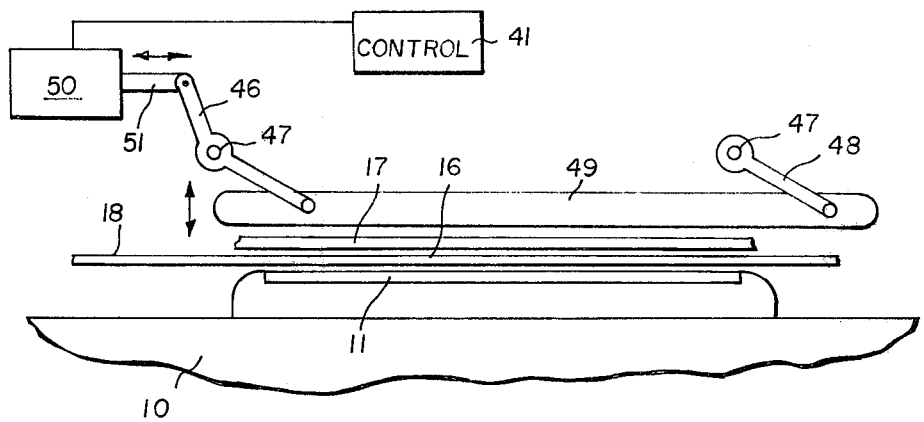
FIG. 3 is a partially schematic, fragmentary view of an alternative platen for the recirculator of FIG. 2.
Figure 5:
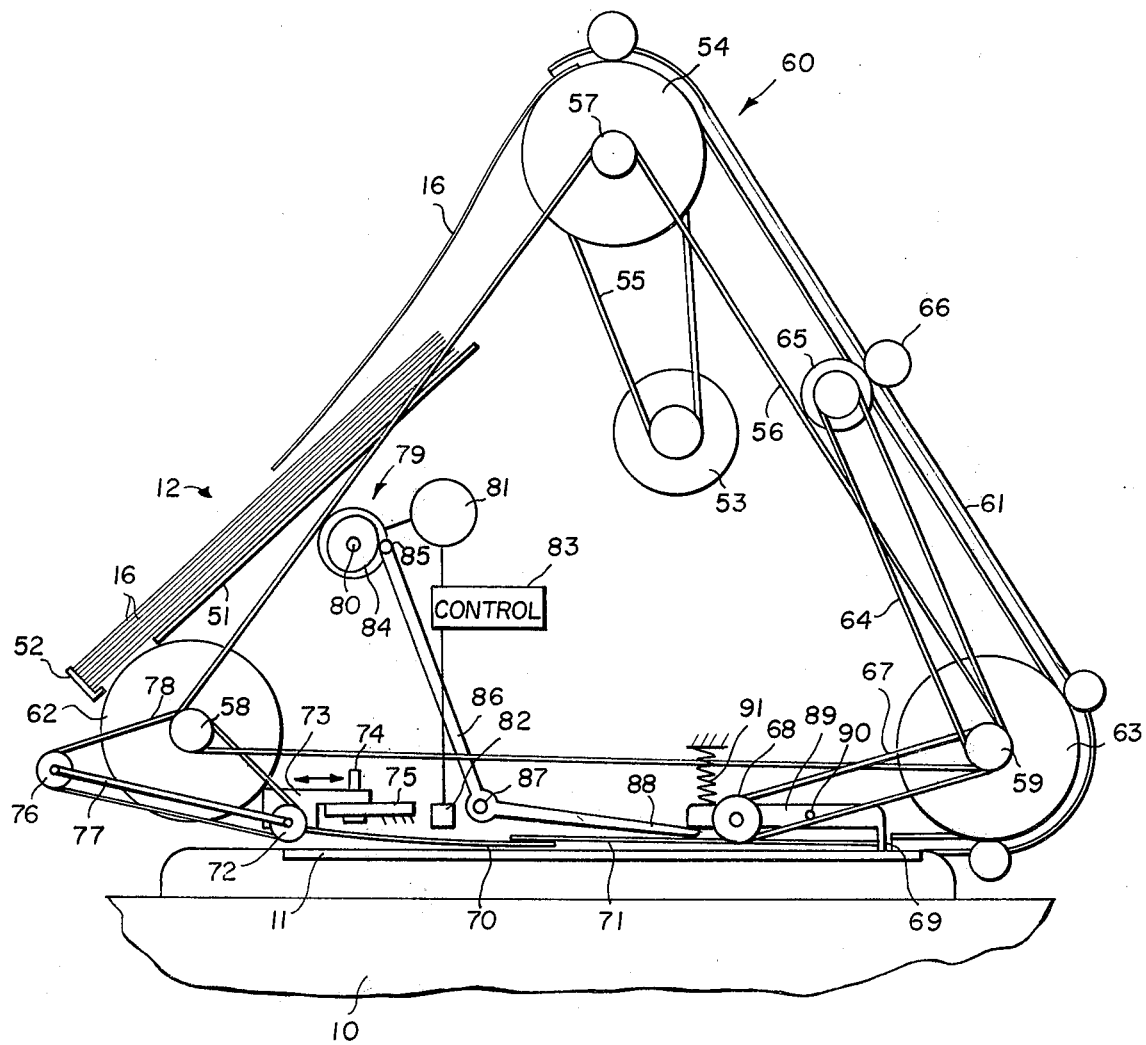
FIG. 5 is a partially schematic, elevational view of another preferred embodiment of the inventive recirculator with the housing removed.

The inventive sheet recirculator 15 operates with a copier 10 having a copier window 11 providing a viewing region where sheets can be copied. Many different kinds of copiers have a relatively unobstructed viewing window, either flat or curved, and usually at the top of the copier where sheets are placed and copied. The inventive sheet recirculator 15 is preferably shaped to rest on top of copier 10 above viewing region 11 as illustrated, and preferably operates during the copier dwell interval between scanning of one sheet and readiness to scan again, for advancing sheets in succession into viewing region 11. For example, page one of a document is positioned over window 11 by recirculator 15, copier 10 cycles to make a copy of page one, and in the dwell interval before copier 10 is ready to make a second copy, recirculator 15 moves page one beyond window 11 and positions page two over window 11. Between each cycle of copier 10, recirculator 15 takes away a copied sheet and provides a succeeding sheet. Copier 10 then makes successive copies without interruption, and recirculator 15 positions pages successively in order for as many recirculations of the pages of the original document as required to make the desired number of copies. The copy pages are in the same order as the document pages and are repeated successively for as many copies of the document as desired. Copier 10 and recirculator 15 are stopped when sufficient copies are made, with the copies collated and ready for use.

Present copiers scan a document sheet that is motionless at the viewing window and use a light-and-lens system that moves relative to the document. The inventive recirculator allows the document to be moved past a fixed light-and-lens system at the viewing window to simplify both the copier and the recirculator. The recirculator then provides a steady rate of feeding speed for the document and is synchronized with the copier so that the document is scanned by a fixed light-and-lens system within the copier, and documents are advanced successively at whatever speeds the copier is able to accept them. The recirculator is then simpler in using a continuous drive, and the copier is also simpler in not having to move a light source and lens system. The inventive recirculator applies to either type of copier operation.

The recirculation of sheets of a document occurs around a circulation path that is generally triangular in elevation as shown by the arrows in FIG. 1. A supply stack 12 of the sheets of the document is arranged along a first side of the triangle between a back guide 13 and a front guide 14 so that the sheets of stack 12 are supported on an incline and are generally above viewing window 11. Sheets are removed one at a time in succession from the bottom of supply stack 12 and are fed around the lower left corner of the triangular path and into viewing position over window 11 on a second side of the path. Each sheet is either stopped over window 11 for long enough to allow copier 10 to make a copy, or passes over window 11 as copier 10 operates, and then the copied sheets are advanced around the lower right corner of the triangular path, upward along a third side of the path to the upper region of the supply stack where the sheets are dropped in succession onto the top of stack 12. The incline of stack 12 lets each successive sheet slide back down on top of the stack so that the recirculation proceeds simply and automatically with no reversal of motion or switching between paths. Recirculator 15 operates in synchronization with copier 10 so that copier 10 cycles along at its usual rate, and recirculator 15 provides sheets in the proper succession so that copies are automatically collated.

One preferred form of recirculator 15, as schematically illustrated in FIG. 2, uses a pair of belts for advancing sheets 16 from stack 12 around the triangular path. Both belts are preferably formed of resin material with inner belt 17 being substantially opaque and outer belt 18 being substantially transparent. Outer belt 18 passes over supply stack 12, and inner belt 17 passes under supply stack 12, and belts 17 and 18 travel together along the second side of the path over copier window 11 and up the third side of the path to the top of the supply stack 12.

A motor 19, preferably arranged in a rear region of recirculator 15, is connected through an electrically controlled clutch and brake 20 to a drive belt 21 driving pulley 22 at the top of the triangular path. Motor 19 runs continuously, and clutch and brake 20 engages and disengages at the proper times to drive belt 21 for advancing feed belts 17 and 18 in a start-and-stop movement synchronized with copier 10. Clutch and brake 20 is not used for continuous drive of belts 17 and 18 for a copier 10 that copies a moving sheet. A pulley 23 turning with pulley 22 drives a belt 24 that extends around pulleys 25 and 26 behind feed belts 17 and 18 so that every time pulley 22 rotates, belt 24 moves, and when pulley 22 stops, belt 24 stops. In turn, pulley 25 drives a pin drum 27 having pins 28 that retractably extend through edge perforations 29 (FIG. 4) in feed belts 17 and 18 for advancing the feed belts. Perforations 29 are preferably spaced to fit standard computer paper and computerpaper drives, and pin drive 27 can be formed and operated in any of several generally known ways. Belts 17 and 18 may require static eliminators and dust-removing pads or brushes, but these are generally known and can be applied as desired.

Belt 24 also extends around pulley 26 driving a friction feed device formed of a roller 30 cooperating with a contiguous roller 31 which can be either fixed or connected to roller 30 by coupling gears 32 to rotate counter to roller 30. Either way, devices 30 and 31 combine to provide a friction feed engaging and advancing the bottom sheet of stack 12 whenever pulley 26 is driven by belt 24. Several forms of friction feeders are generally known, and their details can be varied in several ways. The objective, however, is feeding the bottom sheet only from stack 12 each time recirculator 15 is advanced, and to insure accuracy in this, a double-sheet sensor 33 is arranged along the path of sheet travel between the friction feeder and copier window to detect any feeding of more than a single sheet and to stop the operation of recirculator 15 if this occurs. For continuous drive of belts 17 and 18, an intermittent drive of a friction feeder synchronized with copier 10 is preferred for spacing the sheets at proper intervals to fit the cycle time of copier 10.

Outer belt 18 passes straight over supply stack 12 between roller 22 and a tension roller 34, and inner belt 17 is guided under supply stack 12 by idler roller 36 and a tension roller 35. Belts 17 and 18 meet at a nip in the region of tension roller 35 and travel together until they separate on passing over upper roller 22.

Above copier window 11 and inside of inner belt 17 is a fixed plate 37 and an inflatable diaphragm or bladder 38 that is filled and emptied under control of valve 39 for pressing inner belt 17, a document sheet 16, and outer belt 18 tightly against copier window 11 during the interval when the copy is being made. A sensor 40, which can be optical-electric or mechanical-electric, senses the arrival of the leading edge of a sheet 16 over copier window 11, and control 41 responds to this to stop the belt drive by disengaging the clutch and applying the brake of device 20. Bladder 38 is then inflated by air pump 42 under control of valve 39 to hold the sheet of the proper position for copying. Recirculator 15 remains motionless in this position until copier 10 finishes scanning sheet 16, and this is detected by sensor 43 that is preferably an optical-electric sensor producing a signal for control 41. When copier 10 finishes scanning document 16, bladder 38 is deflated through valve 39, and recirculator 15 is advanced until the next sheet reached the copier window as detected by sensor 40.

Recirculator 15 is loaded by placing sheets 16 of a document stack 12 in between back guide 13 and front guide 14 either by sliding stack 12 edgewise into recirculator 15, or by pulling out a sheet-receiving tray or a drawer including guides 13 and 14. The loaded sheets 16 rest against drum 31 of the friction feed, or a stop can also be used to set the position for the lower edges of the sheets 16 in stack 12. Copier 10 is put in operation, and recirculator 15 is turned on to advance the bottom sheet from stack 12 around roller 30 and into the nip between belts 17 and 18 in the region of tension roller 35 and to move sheet 16 up to sensor 40 which then stops recirculator 15 to allow copier 10 to cycle. Copier 10 makes a copy of sheet 16 which is viewed through transparent outer belt 18 held tightly against copier window 11 by inflated bladder 38. When copier 10 finishes scanning sheet 16 as detected by sensor 43, recirculator 15 is started up to advance the bottom sheet of stack 12 up to sensor 40, and move the copied sheet around pin drum 27 and up the third side of the path toward upper roller 22. Another copy cycle is made, and as sheet after sheet advances, each copied sheet is returned to the top of supply stack 12 as its trailing edge drops away from upper roller 22 where belts 17 and 18 separate. The incline of stack 12 is sufficient so that the sheet slides back down to rest against drum 31 like the other sheets already in stack 12.

Belt 18 can have indicia 44 maked along a margin or elsewhere to provide a brand name identification, or any other desired identification for copies, and use of belt 18 allows many possibilities for deliberate visual effects in copies, such as the effect provided by perforations 45 that both lighten the mass and inertia of belt 18 and give the copies a faint patterned effect. Copies for a certain department or a particular customer or for a specific project can be identified by using appropriate indicia on belt 18. Also, standard computer-paper perforations 29 and pin drive 27 allow computer paper to be fed through recirculator 15 for copying in a manner similar to the copying of sheets 16.

FIG. 3 shows an alternative to bladder 38 for holding sheet 16 and belts 17 and 18 tightly against the window 11 of copier 10. A pair of rocker arms 46 and 48 are mounted on pivots 47 and joined to a movable platen 49 arranged over inner belt 17. A solenoid 50 makes shaft 51 reciprocally to turn rocker arm 46 and raise and lower platen 49. On signals from control 41, solenoid 50 moves shaft 51 to the left to raise platen 49 and allow advance of belts 17 and 18 carrying sheet 16, and when a new sheet 16 is properly positioned over copier window 11, solenoid 50 moves shaft 51 to the right as illustrated to lower platen 49 to hold belts 17 and 18 and document 16 firmly against window 11 for copying. Other devices can also be used for pressing the belts and the document sheet against the copier window during the time the sheet is scanned, and guides or rollers are preferred for holding continuously moving belts in the proper position for copying while sheets are moving.

Recirculator 60, as schematically illustrated in FIGS. 5–8 accomplishes the same general result as recirculator 15 relative to copier 10 but uses a different sheet advancing mechanism. Generally, this if formed of continuously driven rollers and guides that advance sheets whenever the sheets engage the rollers, the drive rollers cooperate with a feeding mechanism for starting each sheet in motion, a stop device stops each sheet at copier window 11 for copying, and a start device starts the copied sheet moving into engagement with a drive roller after the sheet is scanned. The path around recirculator 60 is also generally triangular and in the same general form as the path used in recirculator 15. Also, the start-and-stop mechanisms can be omitted for a continuous feed recirculator for copying while sheets are moving.

Supply stack 12 of sheets 16 is similarly positioned in a holder tray 51 having a stop 52 along its lower end. Motor 53 drives pulley 54 continuously with belt 55, and another belt 56 extends around a pulley 57 that it turns with pulley 54 so that belt 56 drives pulleys 58 and 59, which in turn drive rollers 62 and 63. Belt 56 is preferably arranged at the rear of recirculator 60 so as not to interfere with travel of sheets 16.

An edge guide 61 preferably formed as a U-shaped channel extends along the third side of the triangular path from roller 63 to roller 54 for guiding one edge of the sheets 16, and rollers along the feed path are generally angled slightly toward guide 61 to hold sheets 16 against guide 61 similar guide channel (not shown) preferably guides the sheets over copier window 11. By means of a belt 64 from pulley 59, roller 65 is driven against a contiguous roller 66 for moving sheets along the third side of the feed path. Another belt 67, also driven by pulley 59, drives a start roller 68 for moving copied sheets out of a position over copier window 11.

Figure 6:
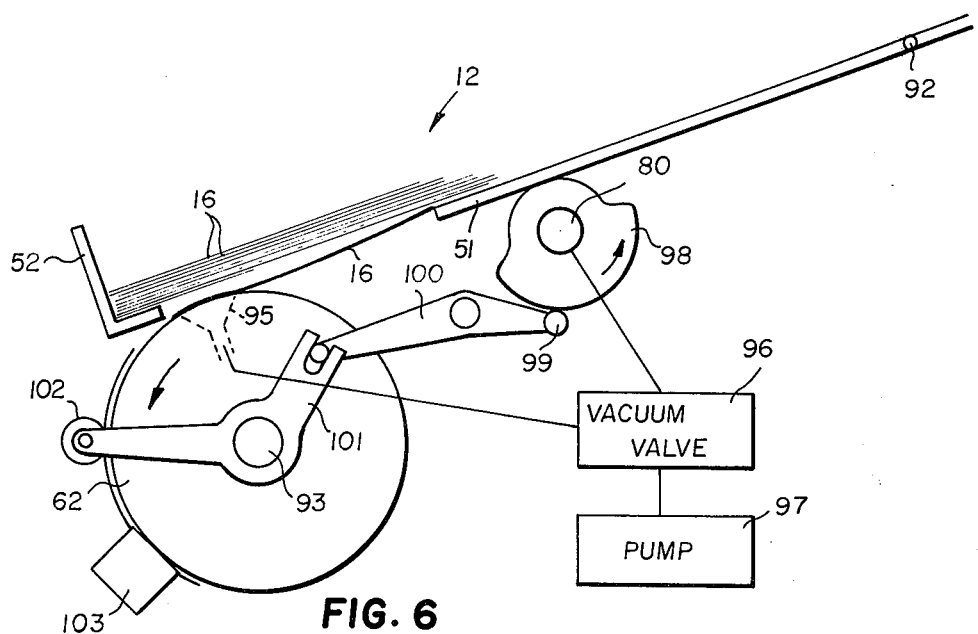
FIGS. 6 and 7 are partially schematic, fragmentary views of a sheet removing mechanism for the recirculator of FIG. 5.
Figure 7:
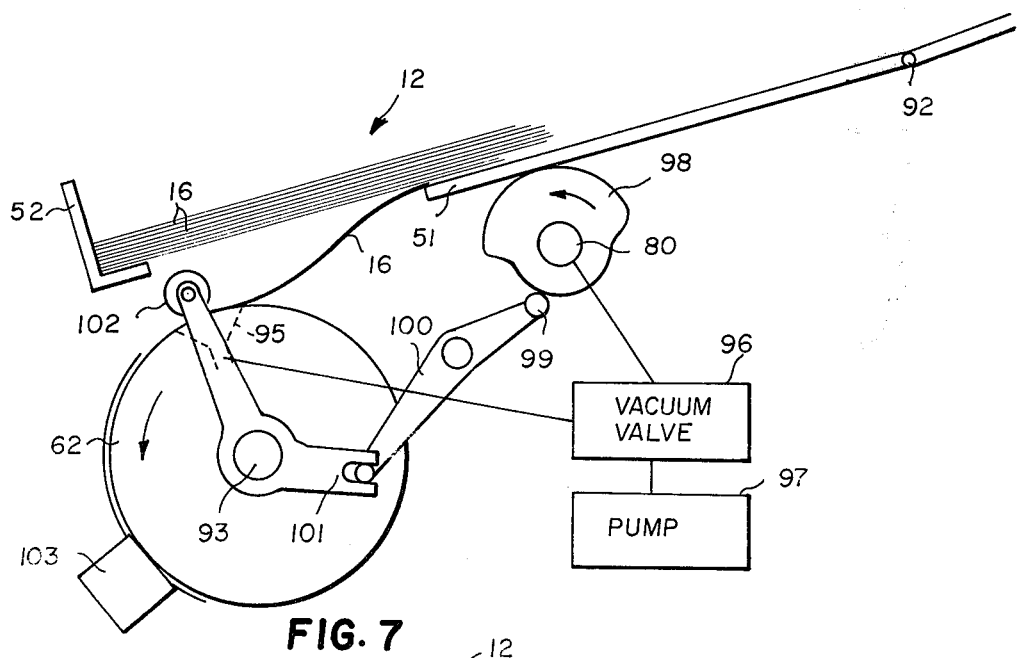
Figure 8:
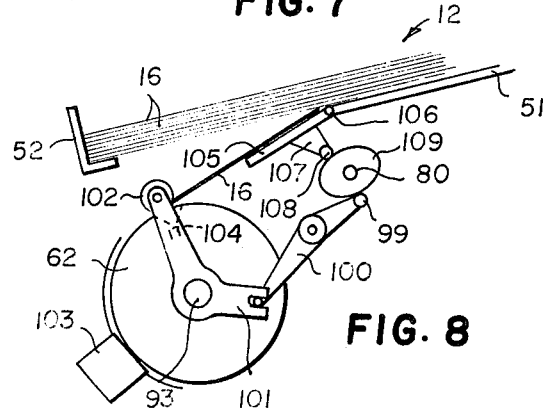
FIG. 8 is a partially schematic, fragmentary view of an alternative sheet remover for the recirculator of FIG. 5.

The feeding of the bottom sheet from supply stack 12 for starting a sheet on a course of travel around recirculator 60 is best shown in FIGS. 6–8, and is described below. Once a sheet is removed from stack 12 and placed in engagement with continuously driven roller 62, the sheet is pulled out of the supply stack 12 and advanced into the second side of the path along edge guide 61 until the sheet moves into the proper position over copier window 11. The leading edge of the sheet is stopped in the proper position by a stop 69, and the sheet is held flat against copier window 11 by resin sheets 70 and 71 that overlap and serve as a platten.

The trailing edge of the sheet is pushed against stop 69 by a continuously driven roller 72 mounted on a bracket 73 that is adjustable in the direction of the arrows by means of a bolt 74 clamping bracket 73 to a fixed arm 75. Roller 72 is coupled to another roller 76 through a connecting arm 77, and a belt 78 passing around pulley 58 and rollers 72 and 76 drives roller 72 continuously. Such an arrangement allows roller 72 to be positioned along the path of travel of a sheet by adjusting bracket 73 so that when the trailing edge of the sheet passes beyond the reach of roller 72, the leading edge of the sheet engages stop 69. The adjustability of roller 72 thus accommodates different lengths of sheets 16. Resin sheet 70 is attached to bracket 73 and moves along with bracket 73, and resin sheet 70 extends loosely under another resin sheet 71. A paper sheet 16 advanced by roller 72 slides under resin sheets 70 and 71 which simply rest on paper sheet 16 to hold sheet 16 flat against copier window 11.

A cam system 79 on a cam shaft 80 is driven through one complete 360° rotation by rotation control device 81 for each operating cycle of recirculator 60. Cam shaft 80 preferably extends along the width of recirculator 60 and contains several cams for accomplishing all the operations necessary to synchronize recirculator 60 with copier 10. Rotational control device 81 is presently available in several forms, such as the PSI brand incremental rotation control package from Bulletin A-16 of September 1970, and can drive cam shaft 80 in one complete rotation with very little error and with no accumulated error. A sensor 82 positioned in the region of copier window 11 is preferably an optical-electric sensing device to determine when the scanning of a sheet 16 is completed by copier 10. This is signaled to a control 83 that operates rotation device 81 to rotate cam shaft 80 one complete revolution, and cams on shaft 80 control all the operations necessary for removing another sheet from stack 12 and advancing the copied sheet away from copier window 11.

One cam 84 on shaft 80 is tracked by a follower 85 on a rocker arm 86 mounted on a pivot 87 for raising and lowering the operating end 88 of arm 86. When end 88 is raised, another arm 89 carrying start roller 68 and mounted on pivot 90 is lifted up against the bias of spring 91 to lower stop 69 to the position illustrated in FIG. 5 for stopping the leading end of a sheet 16 in a proper position over copier window 11. When sheet 16 is completely scanned by copier 10 as detected by sensor 82 and cam shaft 80 is rotated, cam 84 releases rocker arm 86 to allow lower end 88 to pivot downward under the bias of spring 91 to lift stop 69 clear of the path of the copied sheet 16 and to lower start roller 68 into engagement with the copied sheet. Roller 68 then drives the sheet away from copier window 11 and into engagement with continuously driven roller 63 which advances the copied sheet on its way up the third side of the path to upper roller 54 and back to the top of the supply stack 12. Rocker arm 86 then returns to the position illustrated in FIG. 5 so that stop 69 stops the leading end of the succeeding sheet advanced into the second side of the path after removal from the bottom of supply stack 12.

FIGS. 6 and 7 show one preferred way of removing the bottom sheet 16 from supply stack 12. The support plate 51 for supply stack 12 is mounted on a pivot 92 so that its lower end in the region of stop 52 can be moved up and down relative to continuously driven roller 62. Roller 62 is preferably a series of wheels spaced along an axial shaft 93, and a series of fixed suction cups 95 are arranged between the wheel sections of roller 62. Suction cups 95 are evacuated under control of a vacuum valve 96 controlling the air flow to pump 97 and operated by a cam on cam shaft 80 so that when cam shaft 80 rotates, vacuum valve 96 opens to evacuate suction cups 95 and hold the bottom sheet 16 of supply stack 12 in the plane of a tangent to drive roller 62.

Another cam 98 on cam shaft 80 rotates to engage plate 51 and pivot supply stack 12 upward to the position shown in FIG. 7, leaving bottom sheet 16 held down by suction cups 95. Cam 98 is also tracked by a follower 99 on a rocker arm 100 that engages another rocker arm 101 pivotally mounted on shaft 93 and carrying a nip roller 102 that moves around the circumference of drive roller 62 from the position of FIG. 6 to the position of FIG. 7. This moves nip roller 102 in under supply stack 12 to press bottom sheet 16 from the position held by suction cups 95 into engagement with continuously driven roller 62. This pulls sheet 16 from the bottom of supply stack 12 and advances it around the lower left corner of recirculator 60 and into the second side of the recirculation path over copier window 11. A sensor 103 detects any double-sheet removal and stops the recirculator.

Another alternative for removing the bottom sheet 16 from supply stack 12 is shown schematically in FIG. 8. Support plate 51 and abutment 52 for supply stack 12 are fixed above continuously driven roller 62, and suction cups 104 are mounted on arm 105 supported on pivot 106. Arm 105 carries an arm 107 bearing a follower 108 that is raised and lowered by a cam 109 on cam shaft 80 so that suction cups 104 pivot up to engage the bottom sheet of stack 12 and then pivot back down to the region of the circumference drive roller 62 where the bottom sheet is pressed against drive roller 62 by nip roller 102 which moves as previously described. This is similar to the embodiment of FIGS. 6 and 7, except that the supply stack is stationary and suction cups 104 pivot, rather than suction cups being fixed and supply stack 12 being raised. Either way, the bottom sheet is moved downward relative to supply stack 12, and room is provided for nip roller 102 to move up over the bottom sheet and press it against continuously driven roller 62 that withdraws the bottom sheet from stack 12 and advances it into the second side of the circulation path.

With either of the sheet removing mechanisms of FIGS. 6–8, each cycle of operation of recirculator 60 removes the bottom sheet from supply stack 12 and advances it around drive roller 62 and up to drive roller 72 which pushes the trailing edge of the sheet under plattens 70 and 71 until the leading edge of the sheet engages stop 69. All this preferably occurs within the dwell time of copier 10 between scanning a previously copied sheet and becoming ready to make a new scan for a new copy. When the scan is completed for the advanced sheet as detected by sensor 82, cam shaft 80 rotates through another revolution to repeat the same cycle, which includes raising stop 69 and lowering start roller 68 to advance the copied sheet away from the copier window and back up the third side of the path over upper roller 54 and onto the top of supply stack 12. While this is happening, another sheet is removed from the bottom of the stack and advanced over copier window 11. The various cams on shaft 80 are related to each other so that the previously copied sheet is out of the way and stop 69 is returned to the lower position before the leading edge of a succeeding sheet reaches stop 69. In effect, recirculator 60 removes a sheet from stack 12 and advances it to stop 69 quickly during the intercopy dwell time of copier 10, and also advances a previously copied sheet back to the top of the supply stack during the same intercopy interval so that copier 10 can cycle continuously without interruption and make successive copies of sheets 16 as previously explained.

There are many ways that cams, feed rollers, drive belts, control systems, and other devices can be arranged in recirculator 60 for accomplishing the desired results, and those skilled in the art will readily see ways that the general concepts of the invention can be varied. Different ways of removing the bottom sheet from the supply stack can be combined with different ways for advancing the sheet around the triangular path once it is removed from the supply stack, and many generally known sheet-handling and feeding devices can be used in various ways within the general concept of the inventive recirculator.

I claim:

1. In apparatus for feeding document sheets in order from a supply stack to the viewing region of a copier and back to said supply stack, the improvement comprising:
   a. means arranged above said viewing region for forming a circulation path for said sheets, said path being generally triangular in vertical cross section;
   b. means for supporting said supply stack at an incline along a first side of said path;
   c. a second side of said path being arranged to extend from the lower region of said first said of said path across said viewing region;
   d. a third side of said path being arranged to extend from said second side of said path upward to the upper region of said supply stack;
   e. means for successively removing the bottom sheet of said supply stack from said lower region of said supply stack;
   f. means for advancing said removed sheets successively in order into said second side of said path;
   g. means for synchronizing said advance of said removed sheets with operations of said copier for copying said sheets in said viewing region;
   h. means for advancing said copied sheets successively in order from said second side of said path through said third side of said path;
   i. means for advancing said copied sheets successively in order to superposed relation over the top sheet of said supply stack; and
   j. said means for advancing said removed sheets and said copied sheets comprises a pair of endless belts, drive means for said endless belts, and outer one of said belts is substantially transparent, an inner one of said belts is substantially opaque, said inner belt passes under said supply stack, said outer belt passes over said supply stack, and said belts travel together through said second and third sides of said path.

2. The apparatus of claim 1 wherein said synchronizing means is arranged for advancing said removed sheets into said viewing region during a dwell interval between copy cycles of said copier.

3. The apparatus of claim 1 including perforations along the edges of said belts and wherein said drive means includes a pin drive.

4. The apparatus of claim 1 wherein said removing means is a friction feed synchronized with said copier.

5. The apparatus of claim 1 including releasable means for pressing said sheets and said belts toward said copier in said viewing region.

6. The apparatus of claim 5 wherein said pressing means is an inflatable bladder.

7. The apparatus of claim 5 wherein said pressing means is a movable platen.

8. The apparatus of claim 1 wherein said means for moving said sheets into said supply stack includes means for separating said belts above said upper region of said supply stack.

9. The apparatus of claim 1 wherein said synchronizing means is arranged for advancing said removed sheets into said viewing region during a dwell interval between copy cycles of said copier.

10. The apparatus of claim 9 including releasable means for pressing said sheets and said belts toward said copier in said viewing region.

11. The apparatus of claim 10 including perforations along the edges of said belts and wherein said drive means includes a pin drive and said removing means is a friction feed synchronized with movement of said belts.

* * * * *